US008554881B2

(12) United States Patent
Bédard et al.

(10) Patent No.: US 8,554,881 B2
(45) Date of Patent: *Oct. 8, 2013

(54) METHOD AND COMPUTER-READABLE MEDIUM FOR DELIVERING HYBRID STATIC AND DYNAMIC CONTENT BASED ON STATIC CONTENT INREPOSITORY AND DYNAMIC CONTENT RECEIVED FROM SECOND FUNCTIONAL MODULE ACROSS NETWORK

(76) Inventors: Vincent Bédard, Lévis (CA); Marco Vachon, Lévis (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/282,431

(22) Filed: Oct. 26, 2011

(65) Prior Publication Data
US 2012/0042053 A1  Feb. 16, 2012

Related U.S. Application Data

(63) Continuation of application No. 12/434,665, filed on May 3, 2009, now Pat. No. 8,073,902, which is a continuation of application No. 10/823,545, filed on Apr. 14, 2004, now Pat. No. 7,546,341.

(60) Provisional application No. 60/462,300, filed on Apr. 14, 2003.

(51) Int. Cl.
*G06F 15/16* (2006.01)
*G06F 15/173* (2006.01)
*G06F 15/177* (2006.01)

(52) U.S. Cl.
USPC ............ 709/219; 709/203; 717/136; 715/745

(58) Field of Classification Search
USPC ............. 709/203, 217–228; 707/10; 715/745; 717/136
See application file for complete search history.

(56) References Cited

U.S. PATENT DOCUMENTS

| 7,254,825 | B1 | 8/2007 | Sharples | |
|---|---|---|---|---|
| 7,546,341 | B2 * | 6/2009 | Bedard et al. | 709/203 |
| 8,073,902 | B2 * | 12/2011 | Bedard et al. | 709/203 |
| 2002/0035595 | A1 * | 3/2002 | Yen et al. | 709/203 |
| 2002/0088011 | A1 * | 7/2002 | Lamkin et al. | 725/142 |
| 2002/0198844 | A1 * | 12/2002 | Ohmori et al. | 705/51 |
| 2002/0198962 | A1 | 12/2002 | Horn | |
| 2003/0126136 | A1 | 7/2003 | Omoigui | |
| 2003/0161615 | A1 * | 8/2003 | Tsumagari et al. | 386/95 |
| 2004/0044741 | A1 * | 3/2004 | Kelly et al. | 709/217 |
| 2004/0044900 | A1 | 3/2004 | Wang | |
| 2004/0049797 | A1 | 3/2004 | Salmonsen | |
| 2004/0220850 | A1 | 11/2004 | Ferrer et al. | |
| 2005/0066317 | A1 | 3/2005 | Alda et al. | |
| 2005/0086605 | A1 | 4/2005 | Ferrer et al. | |
| 2006/0218245 | A1 | 9/2006 | Horn | |

* cited by examiner

Primary Examiner — Haresh N Patel
(74) Attorney, Agent, or Firm — Benoît & Côté Inc.

(57) ABSTRACT

The present invention relates generally to software functional modules and, in particular, to such modules used for delivering hybrid static and dynamic content. More particularly, there is described a computer-readable storage medium and corresponding method. The storage medium comprises: (a) a repository of static content; and (b) a program element for execution by a computing device to deliver hybrid content via a user interface. The program element comprises: (i) program code means for commanding instantiation of a functional module remote from the computing device; (ii) program code means for receiving dynamic content from the remote functional module; (iii) program code means for accessing the repository of static content; and (iv) program code means for delivering hybrid content on the basis of the static content in the repository and the dynamic content received from the remote functional module.

17 Claims, 1 Drawing Sheet

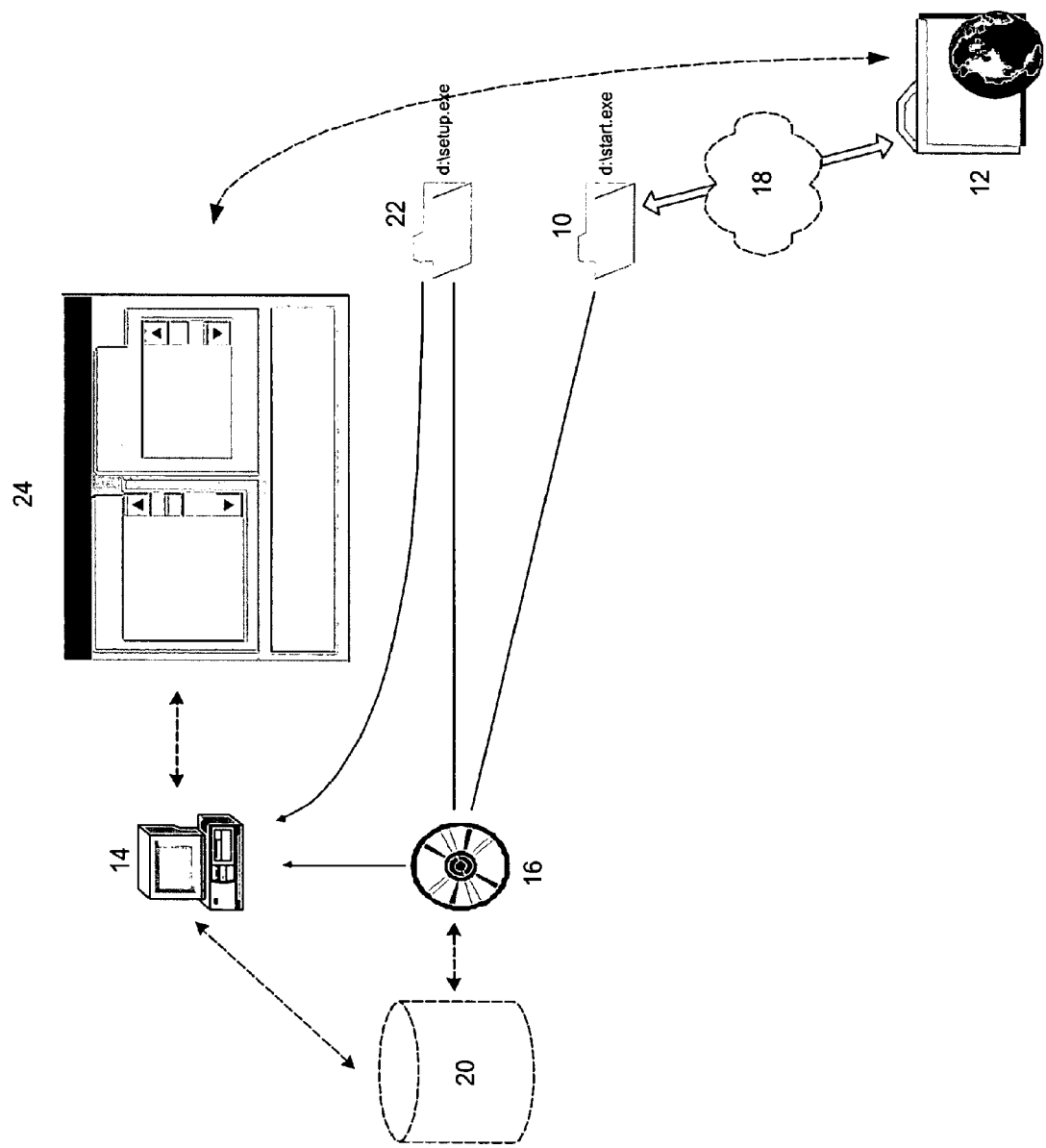

METHOD AND COMPUTER-READABLE MEDIUM FOR DELIVERING HYBRID STATIC AND DYNAMIC CONTENT BASED ON STATIC CONTENT INREPOSITORY AND DYNAMIC CONTENT RECEIVED FROM SECOND FUNCTIONAL MODULE ACROSS NETWORK

CROSS-REFERENCE TO RELATED APPLICATION

This application is filed under 37 CFR 1.53(b) as a continuation application of U.S. patent application Ser. No. 12/434,665 filed May 3, 2009. This application claims priority under 35 USC §120 or 365(c) of U.S. patent application Ser. No. 12/434,665 filed May 3, 2009, now U.S. Pat. No. 8,073,902, and U.S. patent application Ser. No. 10/823,545, filed Apr. 14, 2004, now U.S. Pat. No. 7,546,341, and entitled "METHOD AND COMPUTER-READABLE MEDIUM FOR DELIVERING HYBRID STATIC AND DYNAMIC CONTENT", which claims priority under 35 USC §119 of U.S. Provisional Application Ser. No. 60/462,300, filed Apr. 14, 2003, the specifications of which are hereby incorporated herein by reference in its entirety.

FIELD OF ART

The present invention relates generally to software functional modules and, in particular, to such modules used for delivering hybrid static and dynamic content.

BACKGROUND

Conventionally, access to the internet is provided by way of a browser such as NETSCAPE™ or INTERNET EXPLORER™ installed on a user's computer system. The procedure usually consists of a user opening a browser window and entering the alphanumeric URL (also referred to alternatively as a web page, web site, home page, internet address, etc.). In response, the browser locates the URL on the internet and displays its contents onto the user's screen, sometimes accompanied by audio information.

However, this conventional method of internet access may be considered to have various drawbacks, depending on the circumstances. For example, if a user desires to view the contents of two or more arbitrarily chosen Web pages, then a corresponding number of browser windows needs to be opened. Moreover, the desired web page must be entered individually in each window, either by typing or by accessing a directory of bookmarks. In an environment where information needs to be gathered from multiple sources, opening multiple browser windows is inconvenient. Furthermore, some web pages carry multimedia rich content which, if required to be viewed in real time, may consume bandwidth in excess of what is available, resulting in interruptions or degradation of quality. On the other hand, if the multimedia rich content is first downloaded to the user's computer, this may take an excessive amount of time.

Thus, it is apparent that there is a need in the industry for an improved software application which addresses the foregoing problems.

SUMMARY

According to a first broad aspect, the present invention may be summarized as a method of delivering hybrid content to a user of a computer system, comprising instantiating a first functional module on the computer system; commanding instantiation of a second functional module remote from the first functional module; receiving dynamic content from the second functional module; accessing a repository of static content; and delivering hybrid content on the basis of the static content in the repository and the dynamic content received from the second functional module.

The present invention may also be summarized broadly as a computer system, software module or computer-readable storage medium configured and adapted to implement the above method.

According to another broad aspect, the present invention may be summarized as a computer-readable storage medium, comprising a repository of static content as well as a program element for execution by a computing device to deliver hybrid content via a user interface. The program element comprises program code means for commanding instantiation of a functional module remote from the computing device; program code means for receiving dynamic content from the remote functional module; program code means for accessing a repository of static content; and program code means for delivering hybrid content on the basis of the static content in the repository and the dynamic content received from the remote functional module.

For the purposes of this specification, the expression "software module" should be interpreted broadly to include application software, operating system software, hardware drivers, software loaded on a hardware platform, software upgrades and so on, or any combination thereof.

These and other aspects and features of the present invention are apparent to those of ordinary skill in the art upon review of the following description of specific embodiments of the invention in conjunction with the accompanying drawings.

BRIEF DESCRIPTION OF THE DRAWING

FIG. 1 shows, in functional block diagram form, a local software module and a remote software module which cooperate to deliver a hybrid static/dynamic content to a user's computer system.

DETAILED DESCRIPTION

With reference to FIG. 1, there is provided a local software module 10 and a remote software module 12 that interact with one another to produce a combined hybrid effect, whereby static content is output as a function of dynamic content. By static content is meant content that is not expected to change in time, such as images, video, audio and so on. On the other hand, dynamic content is content that may change in time and that in fact may be continuously updated, such as the data on the internet at any given time.

The local software module 10 can be designed as an executable or auto-executable application residing on a medium such as a CD-ROM, DVD-ROM, digital audio tape, interactive beacon, etc. In such cases, installation of the local software module 10 on a user's computer system 14 is not required. In other cases, the local software module is downloadable from a network such as the internet. In the example below, it is assumed that the medium on which the first software module is located is a CD-ROM 16. For its part, the remote software module 12 can be designed as a callable application residing on a network server. The remote software module 12 could be programmed in a language such as MACROMEDIA FLASH™, for example.

The local software module 10 and the remote software module 12 communicate via a network 18 such as a local area network (LAN), the public switched telephone network (PSTN), the internet, etc. The functionality of the local and remote software modules 10, 12 is now described in greater detail.

A user interested in experiencing a hybrid multimedia presentation inserts a CD-ROM containing the local software module into a drive of the computer system 14. The computer system 14 recognizes the presence of the local software module 10. It should be noted that the computer system 14 is assumed to comprise or have access to a repository of static information 20, such as multimedia content, audio and video streams, databases, bundled MACROMEDIA FLASH™ or DIRECTOR™ applications, etc. In a specific non-limiting embodiment, the local software module 10 could be programmed in VISUAL BASIC™ which encapsulates MACROMEDIA FLASH™ files to allow multimedia functionality, for example.

A detection sub-module 22 of the local software module 10 first may be instantiated in order to perform various system checks for ascertaining adequacy of installed hardware, software and network connections. If the detection sub-module 22 indicates that hardware and/or software inadequacies exist, then this can be flagged to the local software module 10, which takes an action, such as displaying a message on a screen of the computer system 14 or installing the requisite file(s), component(s) or application(s) located on CD-ROM 16.

Upon completion of the detection sub-module 22, assuming that the computer system 14 is equipped with all the necessary hardware, software and network connection, the local software module 10 locates the remote software module 12. This can be done by consulting an internet location (e.g., URL) hard coded in the local software module 10. This internet location can be referred to as a base location.

In any event, the local software module 10 automatically locates the base location without user intervention. Thus, the user is not required to type in the URL of the base location or to click on a particular icon that links to the base location. Stated differently, a user interface 24 "takes the user by the hand", which may lead to wider acceptance of products embodying the invention.

In some embodiments, the remote software module 12 will be located right at the base location. In variations of this concept, the base location itself might not correspond to the location of the remote software module 12 but might instead only point to the location of the remote software module 12. The address pointed to by the base location would then be used by the local software module 10 to access the remote software module 12. This would allow the location of the remote software module 12 to change over time without having to reprogram the local software module 10.

Once the remote software module 12 has been located, it is instantiated by the local software module 10. Of note is the fact that the remote software module 12 may reside on a server connected to the network 18. The remote software module 12 is adapted to access dynamic content elsewhere on the network 18 and to interact with the local software module 10. The configuration of the remote software module may change over time. Examples of dynamic content include, but are not limited to, HTML, XML, databases, video and audio streams, MACROMEDIA FLASH™, ACTIONSCRIPT™, JAVASCRIPT™, LINGO™, as well as e-commerce (Security) data, e.g., credit card, user and password information, etc.

The remote software module 12 has the main functionality of controlling the structure and content of the user interface 24, which is implemented by the local software module 10. From the point of view of structure, the remote software module 12 may provide parameters to the local software module 10 such as colors, dimensions, buttons, window sizes, etc. that make up the user interface 24. The local software module 10 receives these parameters from the remote software module 12 and implements the user interface 24 by accessing selected static or dynamic content.

It should be noted that the parameters associated with the user interface 24 may change at some time in the future, and in fact they may vary regularly depending, for example, on the weather, time of day or the day of the week; alternatively, the parameters associated with the user interface 24 may have a dependency on the physical location of the user (as determined through positioning systems), etc. The remote software module 12 will notify the local software module 10 of such changes, resulting in changes to the user interface 24. It is noted that changes to the user interface 24 may thus be made to occur, even after the medium (e.g., CD-ROM 16) has been permanently recorded and distributed to the user.

In addition, the remote software module 12 provides the local software module 10 with dynamic content updates. Based on dynamic content received from the remote software module 12, the local software module delivers selected portions of the static content in the repository 20, in addition to forwarding some of the received dynamic content directly to the user interface 24.

The above mentioned feature is perhaps best illustrated in the context of a concrete, non-limiting example application, of which there are many. To this end, consider a training tool for financial analysts employed by a financial services company. The training tool is distributed in the form of CD-ROMs to new financial analysts or in the context of a continuing education effort. The tool includes a local software module 10 provided on the CD-ROM 16. The local software module 10 is booted automatically upon insertion of the CD-ROM 16 into the CD-ROM drive of a computer system 14. The local software module 10 is responsible for implementing a user interface 24 on the basis of dynamic content received from a remote software module 12 and static content stored in a repository 20 or on the CD-ROM 16 itself. By way of example, the static content stored on the CD-ROM may include a movie of the president's message, images of industry logos and products, databases of statistics and actuarial charts, tests, simulation runs, maps, etc.

The remote software module 12 may be located on the company server, which provides dynamic content to the local software module 10. This dynamic content may be used to control the structure of the user interface 24, as well as content that is specific to the financial analyst training application at hand. For example, the latter type of information may consist of news clips and stock trading statistics from various web sites and a calendar of the day's events. It will be appreciated that such dynamic content provided by the remote software module 12 can have an effect on the static content being accessed and displayed by the local software module 10.

Consider the case where the most actively traded stock is being sought. This type of content is clearly dynamic. If a window in the user interface 24 has been reserved for displaying corporate information (e.g., a video, logo, etc.) regarding the company whose stock is the most highly traded, then the content of such corporate information, which resides in the repository 20, would be extracted by the local software module 10 in order to be displayed in the window 24. This is an example of how high-quality application-specific seemingly dynamic graphical content from various sources can be delivered without heavy usage of the internet. This type of content can thus be referred to as an example of "hybrid" content.

Myriad applications for delivering hybrid content have heretofore been unimaginable and hence create their own needs as they arise. For example, consider the case where a club owner is desirous of attracting clientele to his or her club. The club owner distributes CD-ROMs to patrons, each CD-ROM 16 containing its own local software module 10. By accessing the CD-ROM 16 via the computer system 14 at his or her home or work, a patron is presented a user interface 24 which has rich multimedia content, such as music representative of the club's selection, while providing the patron with access to updated information about new shows at the club.

Also, the possibilities for advertising using hybrid content delivery are tremendous, as advertisers may combine both static multimedia content (such as product photos, video clips, etc.) and light internet content (such as the event being promoted or a current sale) to give the appearance of delivering full-fledged dynamic content from various internet sources. For example, in the club owner scenario above, an advertiser could be provided with its own window in the user interface 24 that cannot be modified by the patron. In addition, the advertisers themselves could be changed through suitable programming of the remote software module 12.

Moreover, the potential for hybrid content delivery in e-commerce applications is immense. In terms of security, control of what is displayed via the user interface 24 is provided by an external entity (the remote software module 12), which can be more easily controlled. In terms of usability, CD-ROMs containing entire product catalogs (repositories of static information 20) could be provided to users. The remote software module 12 in such instances could consist of an application that runs on the company server and interacts with the user through the local software module 10 and the user interface 24. In this way, the user can browse through products by browsing the CD-ROM without having to browse through the internet; moreover, browsing need not cease when credit card and other information is to be exchanged with the corporation.

Yet another application of the present invention is in the DVD industry, where DVD movie rental typically involves a customer renting a DVD and playing it in a home DVD player. In accordance with an embodiment of the present invention, a DVD will include the local software module 10 as well as a repository of static content 20. The repository of static content 20 includes the movie of interest as well as sounds and images which are common to the beginning of multiple movies. A remote software module 12 could be located on a server belonging to the movie production or distribution company, for example. As increasing numbers of DVD players become integrated with internet access, it will become feasible for movie production or distribution companies to feed dynamic content from the internet to the viewer of the DVD. This can include the latest previews in the form of dynamic content, advertising or news content from various sources. This dynamic content is fed to the local software module, allowing the user to view continuously updatable content in addition to the movie on DVD.

Various enhancements could also be provided. For example, safety features may be built into the captive environment interface 24, such as, by way of non-limiting example, deactivation of one or more functionalities such as mouse buttons or disabling all keys (except, say, for "ALT+TAB" or "CTRL+ALT+DEL"). This may lead to even wider acceptance of the product by a younger audience and particularly their parents or teachers who are often responsible for the computer systems being used by children.

Those skilled in the art should also appreciate that the first and second software modules can be compiled from a high level program written in a number of programming languages for use with many computer architectures or operating systems. For example, the high level program may be written in assembly language, while other versions may be written in a programming language such as C++, JAVA™, VISUAL BASIC™, etc.

While specific embodiments of the present invention have been described and illustrated, it will be apparent to those skilled in the art that numerous modifications and variations can be made without departing from the scope of the invention as defined in the appended claims.

What is claimed is:

1. A method of delivering hybrid content comprising static content and dynamic content to a user of a computer system, comprising:
   instantiating an auto-executable application on the computer system by accessing a computer-readable storage medium comprising the auto-executable application, the computer-readable storage medium being separate from the computer system;
   determining an address by the auto-executable application and subsequently commanding instantiation of a remote software module remote from the auto-executable application at the determined address;
   implementing a user interface by the remote software module which controls the structure, the static content and the dynamic content of the user interface, the remote software module performing the implementing after having been instantiated by the auto-executable application;
   receiving, by the computer system, dynamic content from the remote software module;
   accessing, by the computer system, a repository of static content; and
   delivering, to the user interface, under control of the remote software module:
      at least part of the dynamic content received from the remote software module; and
      selected portions of the static content in the repository on the basis of the dynamic content received from the remote software module.

2. The method defined in claim 1, further comprising executing instructions of the computer-readable storage medium on the computer system, the auto-executable application being located on the computer-readable storage medium.

3. The method defined in claim 2, wherein executing the computer-readable storage medium into the computer system automatically causes instantiation of the auto-executable application.

4. The method defined in claim 1, wherein the repository is located on the computer-readable storage medium.

5. The method defined in claim 4, wherein the remote software module is located on a server connected to the computer system via a network.

6. The method defined in claim 4, wherein receiving dynamic content from the remote software module comprises receiving dynamic content from a plurality of web sites or network location.

7. The method defined in claim 4, further comprising instantiating a third functional module for determining whether the computer system meets hardware, software and connection requirements for delivering the hybrid content, the instantiating of the auto-executable application being performed only if the instantiating the third functional module indicates that the computer system meets the requirements.

8. The method defined in claim 4, wherein delivering comprises delivering to a user interface defining at least one of an audio element and a visual element defined by the parameters.

9. The method defined in claim 8, wherein operation of the computer system is governed by an operating system and wherein the auto-executable application interacts with the operating system to restrict manipulation of the parameters of the visual element by a user of the computer system.

10. The method defined in claim 9, wherein operation of the computer system is governed by an operating system and wherein the auto-executable application interacts with the operating system to restrict manipulation of the parameters of the at least one of an audio element and a visual element by a user of the computer system.

11. The method defined in claim 1, wherein delivering hybrid content comprises triggering a multimedia application on the basis of the dynamic content, the multimedia application using the selected portions of the static content.

12. The method defined in claim 1, wherein delivering hybrid content comprises performing database management on the basis of the dynamic content, the database management using the selected portions of the static content.

13. The method defined in claim 1, wherein delivering hybrid content comprises creating a video stream on the basis of the dynamic content, the video stream using the selected portions of the static content.

14. A computer system configured to implement a method of delivering hybrid content comprising static and dynamic content to a user of a computer system, the computer system comprising a user interface, a computer-readable storage medium and a hardware processor, the method comprising:
  instantiating an auto-executable application on the hardware processor of the computer system by accessing the computer-readable storage medium comprising the auto-executable application, the computer-readable storage medium being separate from the computer system;
  determining an address by the auto-executable application and subsequently commanding instantiation of a remote software module remote from the auto-executable application at the determined address;
  implementing the user interface of the computer system by the remote software module which controls the structure, the static content and the dynamic content of the user interface, the remote software module performing the implementing after having been instantiated by the auto-executable application;
  receiving dynamic content from the remote software module;
  accessing a repository of static content; and
  delivering, to the user interface, under control of the remote software module:
    at least part of the dynamic content received from the remote software module; and
    selected portions of the static content in the repository on the basis of the dynamic content received from the remote software module.

15. The computer system defined in claim 14, wherein the repository is located on the computer-readable storage medium.

16. A non-transitory computer-readable storage medium comprising a program element for execution by a computing device to deliver hybrid content comprising static and dynamic content via a user interface, the program element comprising:
  program code means for executing an auto-executable application for determining an address and subsequently commanding instantiation of a remote software module remote from auto-executable application at the determined address;
  program code means for implementing a user interface by the remote software module which controls the structure, the static content and the dynamic content of the user interface, the remote software module performing the implementing after having been instantiated by the auto-executable application;
  program code means for receiving dynamic content from the remote software module;
  program code means for accessing a repository of static content; and
  program code means for delivering, to the user interface, under control of the remote software module:
    at least part of the dynamic content received from the remote software module; and
    selected portions of the static content in the repository on the basis of the dynamic content received from the remote software module.

17. The computer-readable storage medium defined in claim 16, further comprising the repository of static content.

* * * * *